United States Patent
Lupsa et al.

(10) Patent No.: US 9,029,716 B2
(45) Date of Patent: May 12, 2015

(54) KNOCKOUT FOR ELECTRICAL BOX

(71) Applicant: Thomas & Betts International, Inc., Wilmington, DE (US)

(72) Inventors: Ioan-Liviu Lupsa, Dollard-des-Ormeaux (CA); Andre Goyette, St-Jean-sur-Richelieu (CA); Daniel Lalancette, St-Jean-sur-Richelieu (CA); Marc-Antoine Veillette, Ange-Gardien (CA)

(73) Assignee: Thomas & Betts International, Inc., Wilmington, DE (US)

( * ) Notice: Subject to any disclaimer, the term of this patent is extended or adjusted under 35 U.S.C. 154(b) by 274 days.

(21) Appl. No.: 13/668,423

(22) Filed: Nov. 5, 2012

(65) Prior Publication Data

US 2013/0175086 A1    Jul. 11, 2013

Related U.S. Application Data

(60) Provisional application No. 61/584,397, filed on Jan. 9, 2012.

(51) Int. Cl.
*H02G 3/18* (2006.01)
*H02G 3/08* (2006.01)

(52) U.S. Cl.
CPC ..................... *H02G 3/085* (2013.01)

(58) Field of Classification Search
CPC ....................................................... H02G 3/18
USPC ........................................................ 174/666
See application file for complete search history.

(56) References Cited

U.S. PATENT DOCUMENTS

| | | | |
|---|---|---|---|
| 1,847,924 | A | 3/1932 | Calderwood |
| 2,092,367 | A | 9/1937 | Breitenstein |
| 2,240,187 | A | 4/1941 | Kingdon et al. |
| 2,350,004 | A | 5/1944 | Whistler et al. |
| 2,663,454 | A | 12/1953 | Olson |
| 4,244,483 | A | 1/1981 | Bauer et al. |
| 4,477,537 | A | 10/1984 | Blase et al. |
| 4,640,433 | A | 2/1987 | Jorgensen et al. |
| 4,825,339 | A | 4/1989 | Boudon et al. |
| 4,869,969 | A | 9/1989 | Pavlov et al. |
| 5,191,171 | A * | 3/1993 | Bordwell ...................... 174/666 |
| 5,442,141 | A | 8/1995 | Gretz |
| 5,444,183 | A * | 8/1995 | Gehrs et al. .................. 174/666 |

(Continued)

FOREIGN PATENT DOCUMENTS

| | | |
|---|---|---|
| CA | 2210777 A1 | 2/1998 |
| CA | 2524416 A1 | 6/2006 |

*Primary Examiner* — Timothy Thompson
*Assistant Examiner* — Charles Pizzuto
(74) *Attorney, Agent, or Firm* — Snyder, Clark, Lesch & Chung, LLP (57) ABSTRACT

A knockout structure for a wall of an electrical box includes a cutout that penetrates through the thickness of the wall to form a knockout on an interior of the cutout along a substantial perimeter of the knockout. The knockout structure also includes a first bridge section interrupting continuity of the cutout and maintaining a connection between the wall and the knockout. The knockout structure further includes a second bridge section interrupting continuity of the cutout and maintaining a connection between the wall and the knockout, the second bridge section being different than the first bridge section and on a same half of the perimeter of the knockout.

20 Claims, 12 Drawing Sheets

(56) References Cited

U.S. PATENT DOCUMENTS

| | | | |
|---|---|---|---|
| 5,728,973 A * | 3/1998 | Jorgensen | 174/666 |
| 6,103,973 A | 8/2000 | Sharp | |
| 7,109,415 B2 | 9/2006 | Neitzel et al. | |
| 7,353,961 B2 | 4/2008 | Hull et al. | |
| 7,575,122 B2 | 8/2009 | Hull et al. | |
| 7,812,255 B2 | 10/2010 | Garvin | |
| 7,845,935 B2 * | 12/2010 | Johns et al. | 425/422 |
| 2010/0084188 A1 | 4/2010 | Rajvanshi et al. | |
| 2010/0243315 A1 * | 9/2010 | Shumate et al. | 174/666 |

* cited by examiner

FIG. 7C

KNOCKOUT FOR ELECTRICAL BOX

CROSS-REFERENCE TO RELATED APPLICATION

This application claims priority under 35 U.S.C. §119, based on U.S. Provisional Patent Application No. 61/584, 397, filed Jan. 9, 2012, the disclosure of which is hereby incorporated by reference herein.

BACKGROUND INFORMATION

Electrical outlet boxes typically include knockouts in the walls of the electrical box. During installation, the knockouts may be selectively removed to provide openings for attaching conduits and fittings into the electrical box.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to implementations described herein, a knockout structure for a wall of an electrical box includes a cutout that penetrates through the thickness of the wall to form a knockout on an interior of the cutout along a substantial perimeter of the knockout. The knockout structure includes a first bridge section interrupting continuity of the cutout and maintaining a connection between the wall of the electrical box and the knockout. The knockout structure further includes a second bridge section interrupting continuity of the cutout and maintaining a connection between the wall and the knockout, the second bridge section being different than the first bridge section and on a same half of the perimeter of the knockout.

In another implementation, a knockout structure for a wall of an electrical box includes a cutout penetrating through the thickness of the wall to form a substantially circular knockout, and a bridge section interrupting continuity of the cutout and maintaining an attachment between the wall and the knockout. The knockout may be configured to be separated from the wall of the electrical box by detaching at the bridge section. When separated from the wall, the knockout is configured to detach at a detachment line along the bridge section such that the detachment line is located outside a diameter of the substantially circular knockout.

Figure 1:
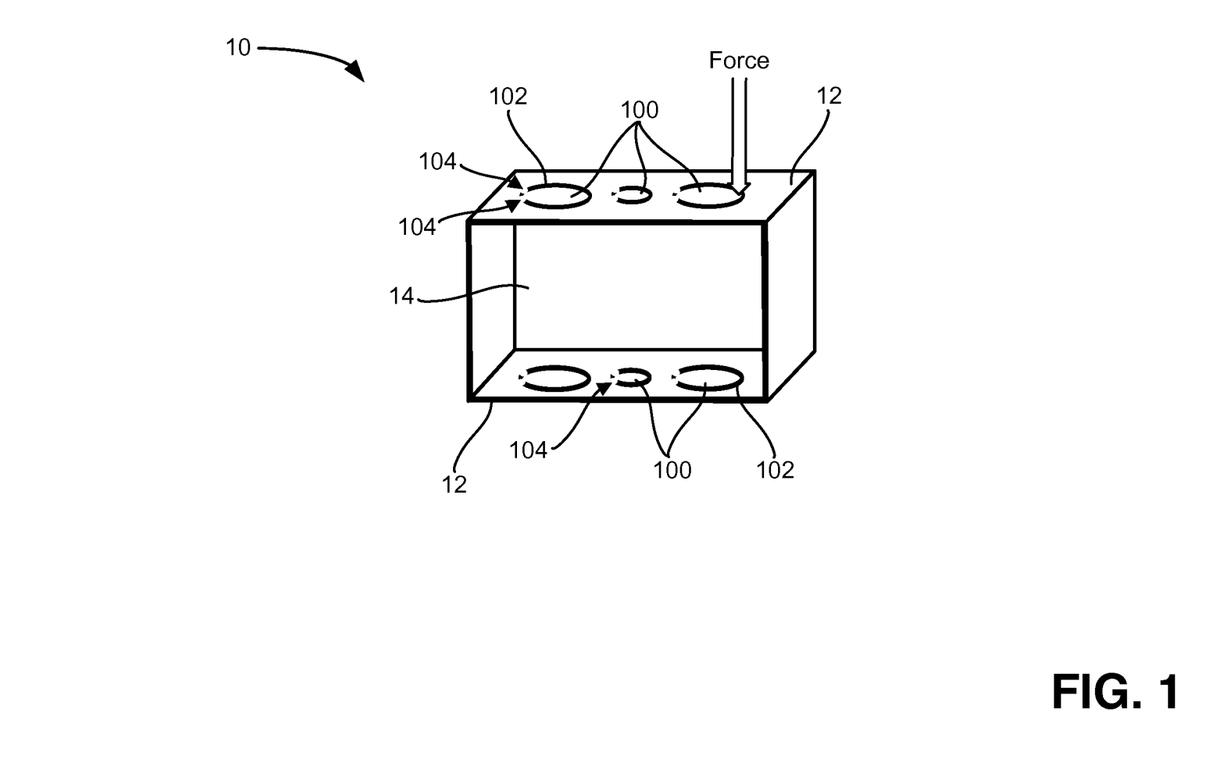
FIG. 1 provides a view of an electrical box in which systems and/or methods described herein may be implemented.

FIG. 1 provides simplified view of an electrical box 10 in which systems and/or methods described herein may be implemented. As shown in FIG. 1, electrical box 10 may have multiple walls 12 extending essentially perpendicularly from a back section 14. Walls 12 may include one or more knockouts 100. In one implementation, electrical box 10 may be fabricated from a metal material, such as a galvanized steel sheet metal. Each knockout 100 may be formed using a punching process to punch a cutout 102 into a wall 12. Generally, cutout 102 may be extend around a majority of a circumference of knockout 100 such that knockout(s) 100 remains connected to wall 12 by bridge (or tab) sections 104, described further herein. One of knockouts 100 may be selectively removed (e.g., by an electrician) by bending knockout 100 at bridge sections 104 until bridge sections 104 break.

Knockouts for electrical boxes are subject to industry standard requirements for strength. Particularly, certain diameter knockouts must be able to withstand a particular amount of force (e.g., applied at a weakest point of knockout 100). As used herein, the term "knockout strength" may refer to the minimum amount of force required to flex a knockout (e.g., at bridge sections 104) to facilitate removal of the knockout. One method to strengthen knockout 100 is to press knockout 100 back into the same plane of corresponding wall 12. However, the pressed-back knockouts may prove difficult to open and may be undesirable for production reasons. When knockout 100 is not pressed back into the plane of wall 12, the knockout strength is a function of the width of bridge section 104, the thickness of wall 112, and the mechanical properties of the material of electrical box 10 (e.g., galvanized steel, etc.).

Figure 2:
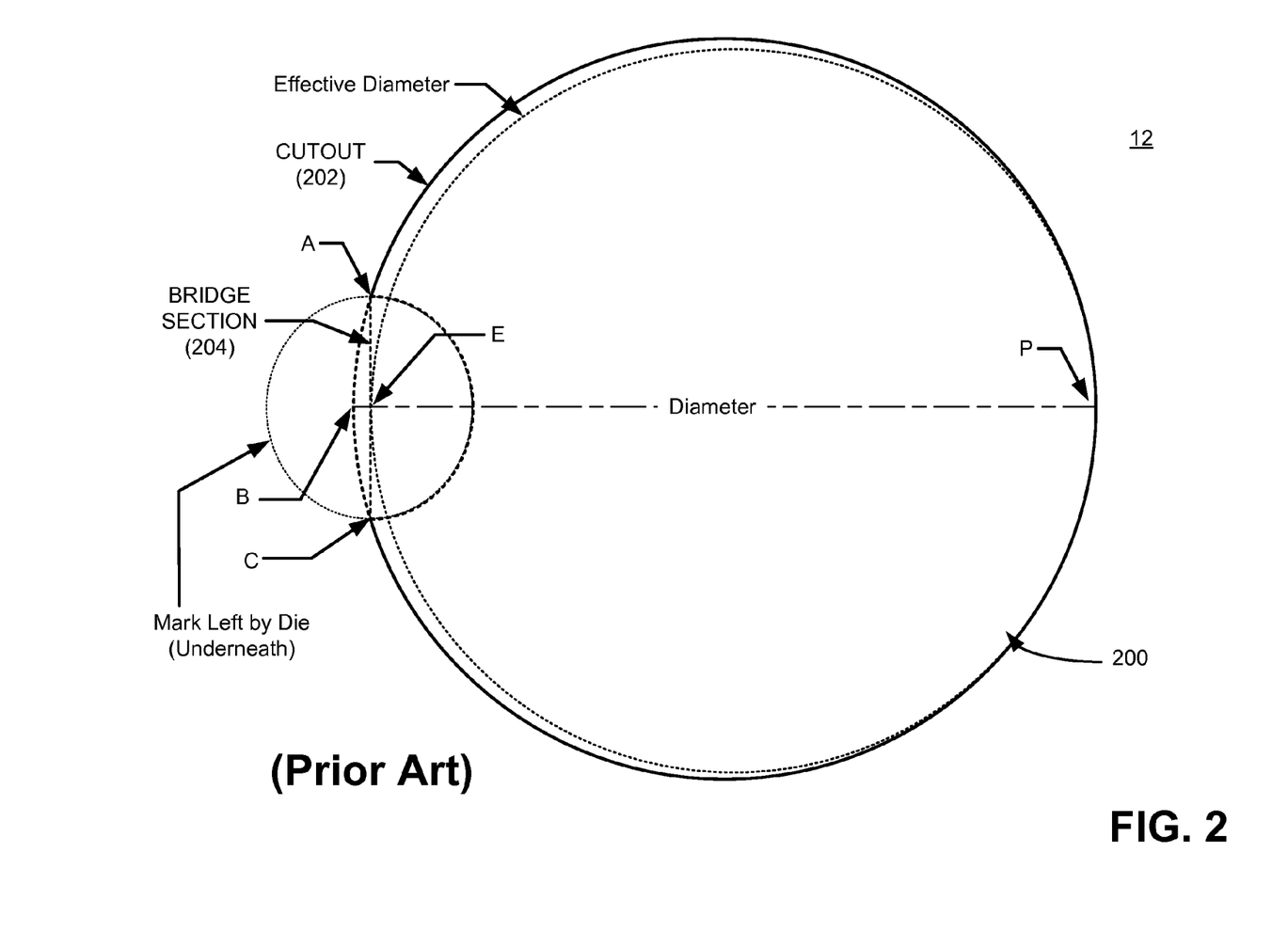
FIG. 2 provides a view of a knockout configuration according a known implementation.

FIG. 2 provides a view of a knockout configuration according a known implementation. As shown, knockout 200 may be formed by a cutout 202 that is interrupted by a bridge section 204. The width of bridge section 204 may span from point A to point C, and may be sized to provide the required knockout strength for a given material and wall thickness. As an example, a knockout for a "half-inch" trade size conduit (e.g., a 0.875 in. actual diameter knockout), may have a bridge section 204 with a width of about one-quarter inch between point A and point C. A disadvantage of the knockout configuration of FIG. 2 is that a burr remains inside the intended circumference after removal of knockout 200. More particularly, when knockout 200 is bent back and forth, the material breaks along a chord from point A to point C instead of following the projected circumference of the cutout 202 through point B. The result of the chord is a burr that reduces the space inside cutout 202 and makes connector installation by the electricians more difficult. As shown in FIG. 2, the effective diameter of cutout 202 may be reduced to the distance between points P and E instead of between points P and B. As used herein, the term "effective diameter" may refer to the diameter of the largest full circle inside a cutout after a knockout is removed. Furthermore, the long span of bridge section 204 can result in high deformation at the burr, causing the burr to extend beyond the plane defined by wall 12.

Figure 3A:
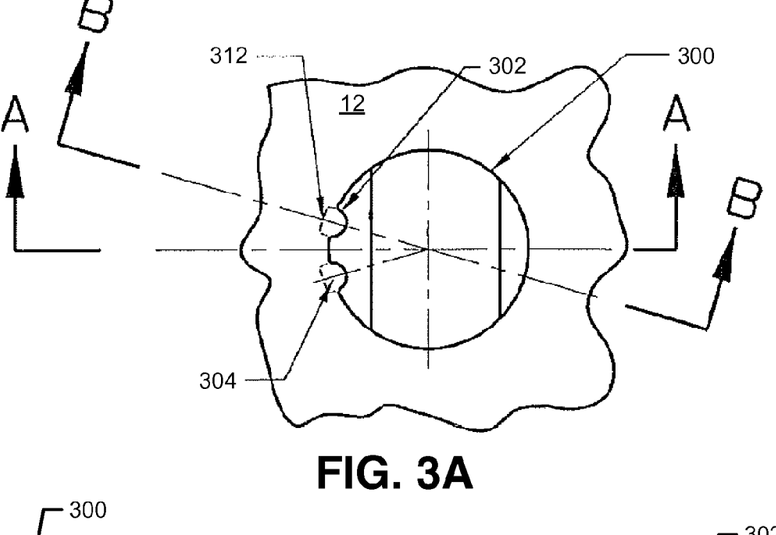
FIG. 3A provides a front view of a knockout for an electrical box according to an implementation described herein.
Figure 3B:
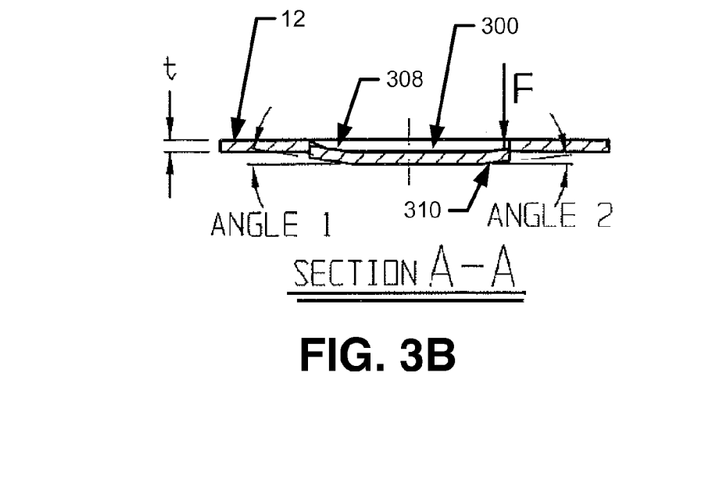
FIGS. 3B and 3C provide cross-sectional views of the knockout of FIG. 3A.
Figure 3C:
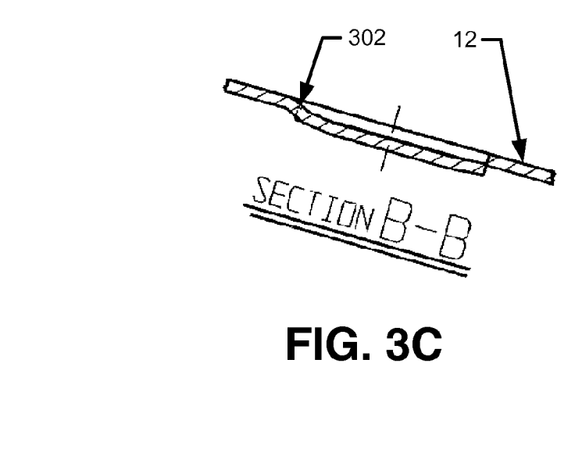
Figure 3D:
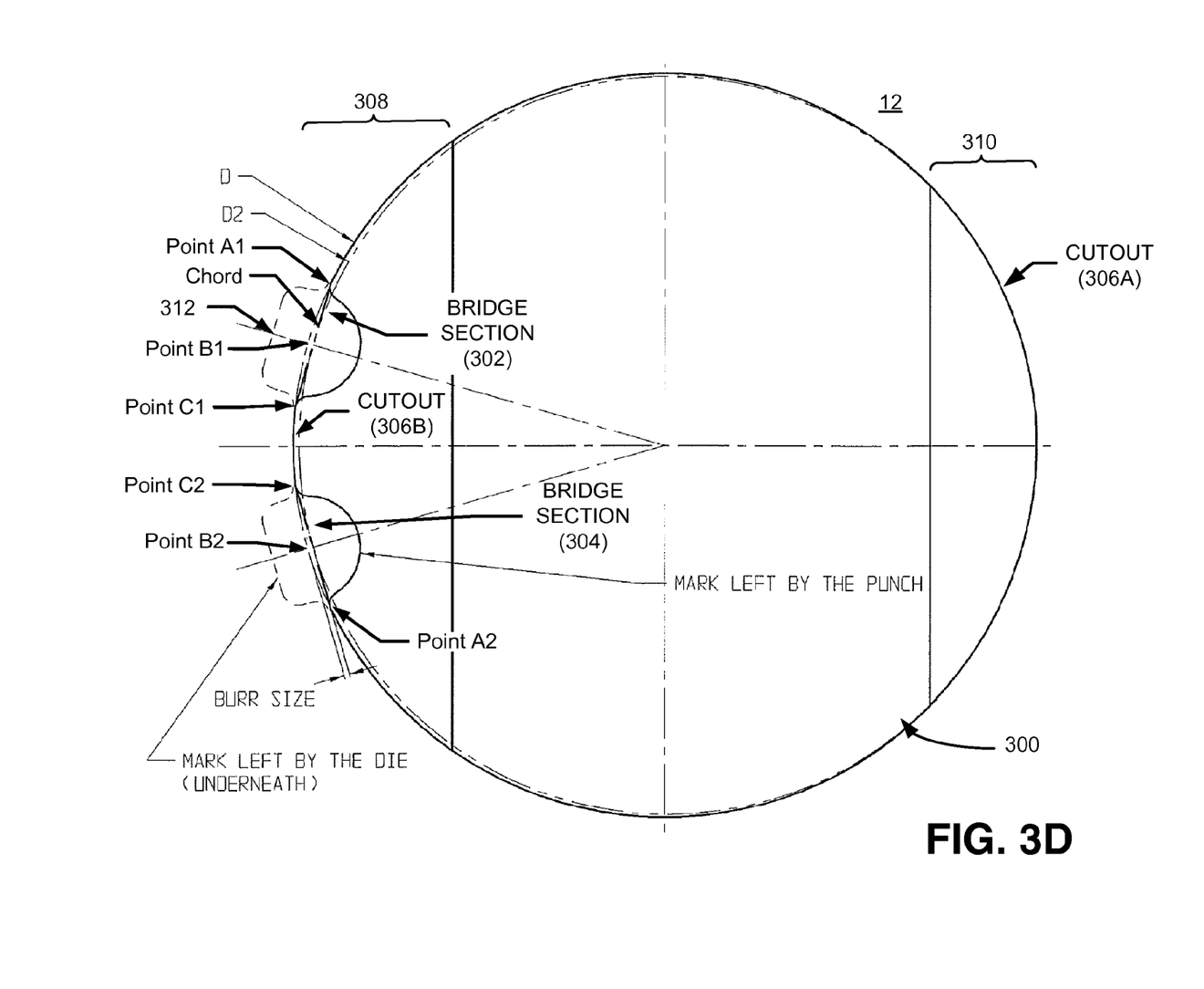
FIG. 3D provides and enlarged front view of the knockout of FIG. 3A.

FIGS. 3A-3D provide front (FIGS. 3A and 3D) and cross-sectional (FIGS. 3B and 3C) views of a knockout 300 for an electrical box according to an implementation described herein. FIG. 3A provides a front view of knockout 300 in a section of wall 12. FIG. 3B provides a cross-sectional view of a section A-A of FIG. 3A. FIG. 3C provides a cross-sectional view of a section B-B of FIG. 3A. FIG. 3D provides an enlarged front view of knockout 300 and bridge sections of FIG. 3A.

Referring collectively to FIGS. 3A and 3D, knockout 300 may be formed by a cutout 306A/B through wall 12 that is interrupted by two small bridge sections 302 and 304. Bridge sections 302 and 304 may interrupt continuity of cutout 306A/B and may maintain a connection between wall 12 and knockout 300. Bridge sections 302 and 304 may be located near each other along the perimeter of knockout 300 and may be substantially identical. Each bridge section 302/304 generally may span from a point A to a point C along a perimeter of knockout 300 and may be sized to provide one-half the required knockout strength for a given material and wall thickness. Thus, as shown in FIG. 3D, bridge section 302 may span from point A1 to point C1 inside midpoint B1, and bridge section 304 may span from point A2 to point C2 inside midpoint B2. As an example, for a standard gage, "half-inch" diameter knockout (e.g., 0.875 in. actual diameter), the width of bridge section 302 and the width of bridge section 304 may each be about one-eighth (0.125) inch. In other implementations, bridge sections 302 and 304 may be asymmetrical.

Bridge section 302 and bridge section 304 may separate cutout section 306A from cutout section 306B. As shown in FIG. 3D, cutout section 306A may extend along the circumference D of cutout 300 between point A1 and point A2; while cutout section 306B may extend along the circumference D of cutout 300 between point C1 and point C2. Generally, bridge section 302 and bridge section 304 may be located on the same half of the perimeter of knockout 300 (e.g., along a common semi-circle). In one implementation, the distance between bridge section 302 and bridge section 304, as defined by the size of cutout section 306B, may be a minimal size required to provide a discontinuity between bridge section 302 and bridge section 304. In practice, the size of cutout section 306B may be governed by tooling sizes required to punch through wall 12. For example, in the configuration of FIGS. 3A-3D, the size of cutout section 306B may be about equal to a length of one of bridge sections 302 or 304.

As shown in FIGS. 3B and 3D, knockout 300 may include an angled portion 308 that bends a portion of knockout 300 back toward the plane of wall 12 (e.g., "Angle 1" of FIG. 3B). Angled portion 308 may prevent the complete material crossing by a punch through wall 12 in the area of angled portion 308, while still causing a discontinuity (or cut) at cutout section 306B. Thus, angled portion 308 and wall 12 may be at least partially co-planar and may result in additional knockout strength for knockout 300. In one implementation, cutout 310 may also include a corresponding angled portion 310 that bends another portion of knockout 300 back toward the plane of wall 12 (e.g., "Angle 2" of FIG. 3B).

Figure 4A:
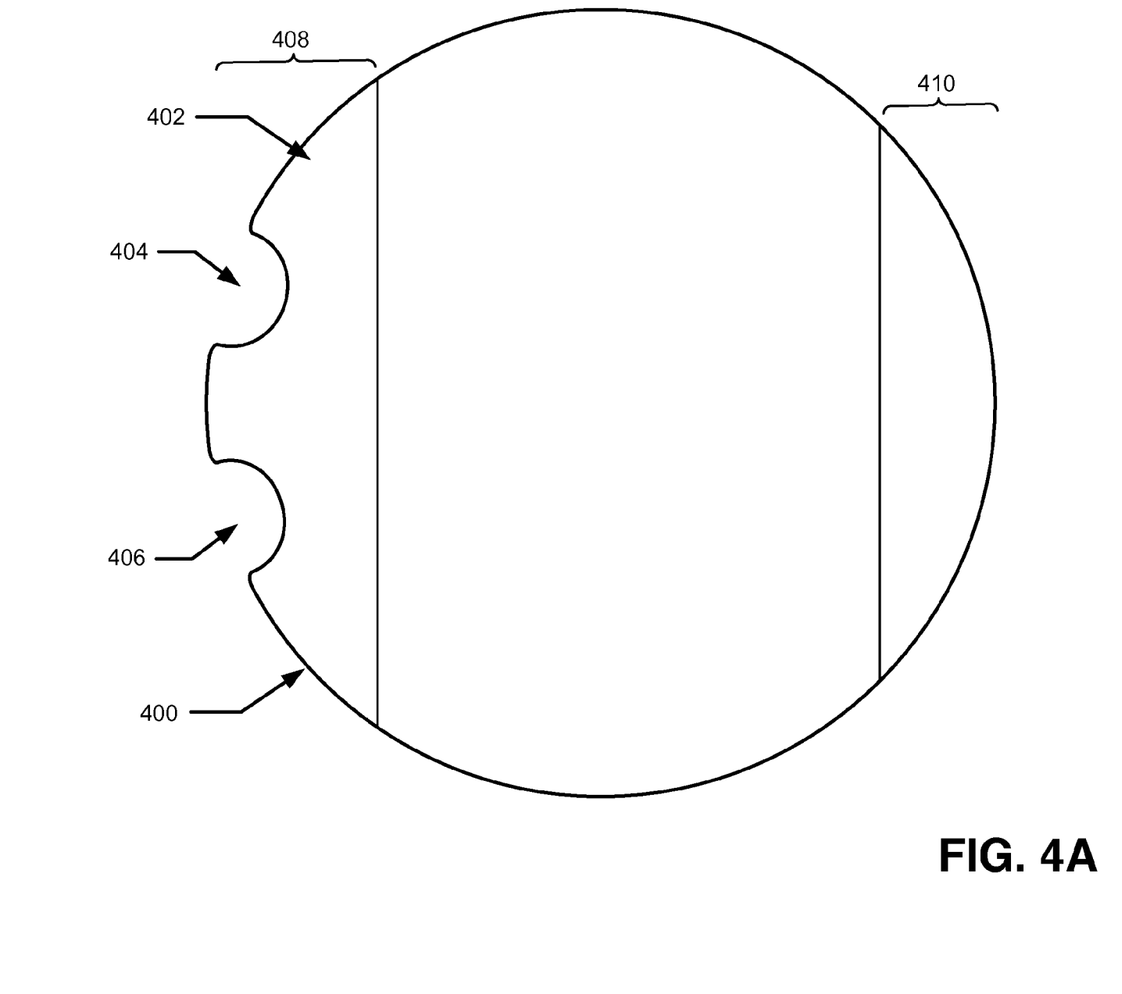
FIG. 4A provides a simplified bottom view of a punch for cutting and forming the knockout of FIGS. 3A-3D.
Figure 4B:
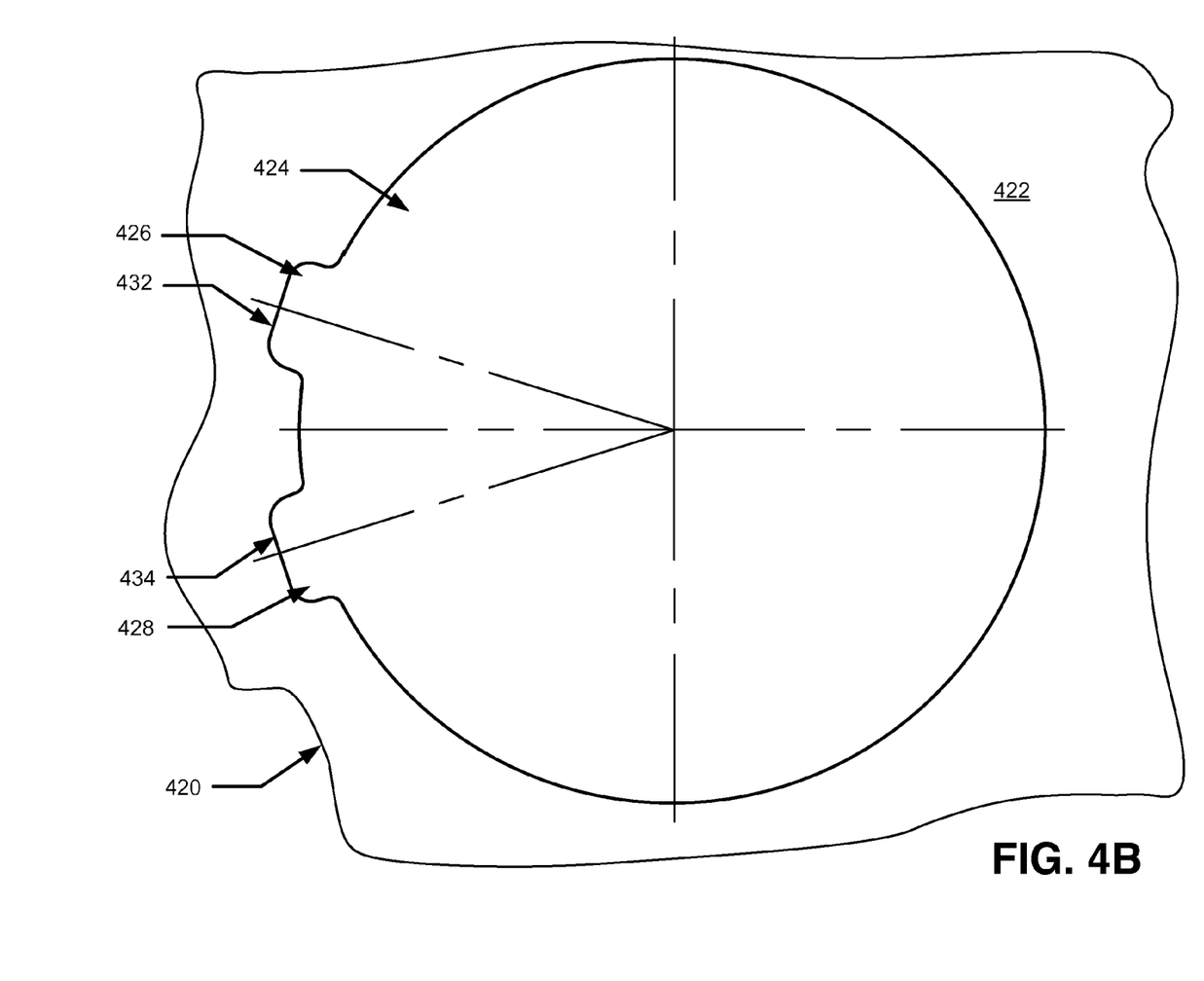
FIG. 4B provides a simplified top view of a die for cutting and forming the knockout of FIGS. 3A-3D.

Generally, knockout 300 may be formed using a punching process that forces a punch through wall 12. While the punch applies force to one side of wall 12, a die may support the work piece (e.g., electrical box 10) on an opposite side of wall 12. FIG. 4A provides a simplified bottom view (e.g., the contact surface) of a punch 400. FIG. 4B provides a simplified top view (e.g., the contact surface) of die 420. Referring to FIG. 4A, punch 400 may be substantially cylindrical with a cutting surface 402 that matches the circumference of knockout 300. Cutting surface 402 may include two recesses 404 and 406 that match the shape of bridge sections 302 and 304, respectively. Angled portion 408 of punch 400 may correspond to angled portion 308 of knockout 300; while angled portion 410 of punch 400 may correspond to angled portion 310 of knockout 300.

Referring to FIG. 4B, a die 420 may be configured to receive knockout 300/punch 400, as punch 400 cuts through wall 12. Die 420 may include a support surface 422 and a recess 424. Support surface 422 may generally support wall 12 against forces applied by punch 400. Recess 424 may receive knockout 300 as punch 400 cuts through wall 12. Recess 424 may include an outer portion 426 with a straight edge 432 and another outer portion 428 with a straight edge 434. Outer portions 426 and 428 may align with recesses 404 and 406, respectively, of punch 400 as cutting surface 402 is applied to form knockout 300.

Figures 5A, 5B:
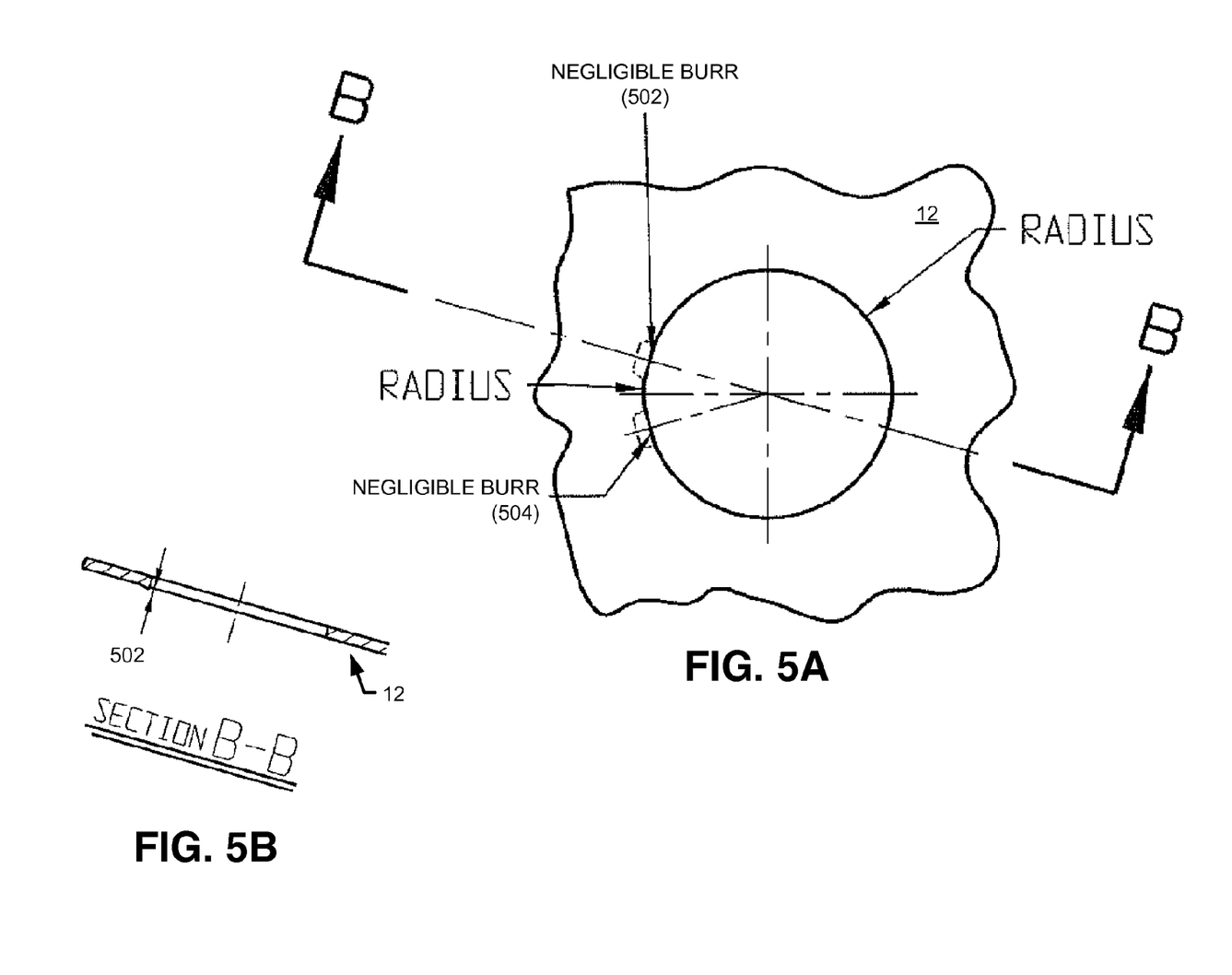
FIGS. 5A and 5B provide front and cross-sectional views, respectively, of the wall section of FIGS. 3A-3D with the knockout removed.

Referring again to FIG. 3D, support surface 422 may cause marks (e.g., conforming to the shape of at least a portion of outer portions 426 and 428 to be applied to an underside of wall 12 during formation of knockout 300. A straight edge 312 (e.g., corresponding to straight edge 432) may be formed on an underside of wall 12. In contrast with a conventional semi-circular edge (e.g., FIG. 2), straight edge 312 may reduce the amount of burr deformation upon removal of knockout 300. FIGS. 5A and 5B provide front and cross-sectional views of the wall 12 section of FIGS. 3A-3D with knockout 300 removed. Removal of knockout 300 from wall 12 may leave negligible burrs 502 and 504. Deformation of wall 12, at burr 502, due to the removal of knockout 300 is shown in FIG. 5B. A similar straight edge (e.g., corresponding to straight edge 434) may be formed on the underside of wall 12 near bridge section 304.

Figure 5C:
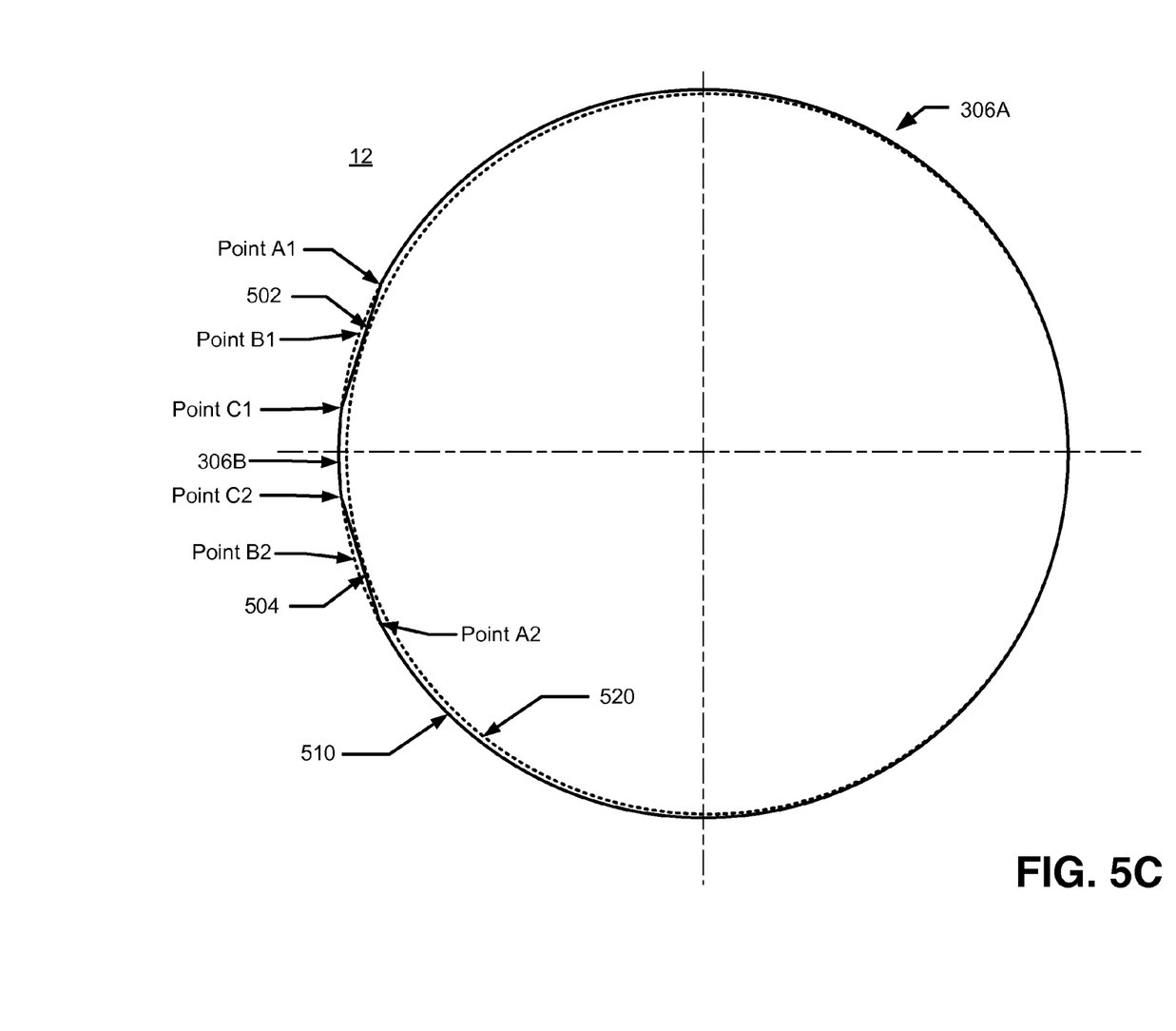
FIG. 5C provides an enlarged front view of the wall section of FIG. 5A.

FIG. 5C provides an enlarged front view of the wall section of FIG. 5A. As shown in FIG. 5C, burr 502 may extend between point A1 and point C1 inside midpoint B1, while burr 504 may extend between point A2 and point C2 inside midpoint B2. Burr 502 and burr 504 may be generally linear and may extend slightly into a design diameter 510 of cutouts 306A/B. However, an effective diameter 520 (corresponding to circumference D2 of FIG. 3D) of the hole created by removal of knockout 300 is nearly the same size as the design diameter 510. Generally, according to implementations described herein, effective diameter 520 may be ninety-eight percent or more of design diameter 510. In a particular example, for standard gage, "half-inch" diameter knockout (e.g., 0.875 in. actual diameter) where cutout 306B is equal in length to one of bridge sections 302/304, the effective diameter 520 may be less than one percent (e.g., 0.868 in. effective diameter) smaller than the design diameter 510.

Figure 6A:
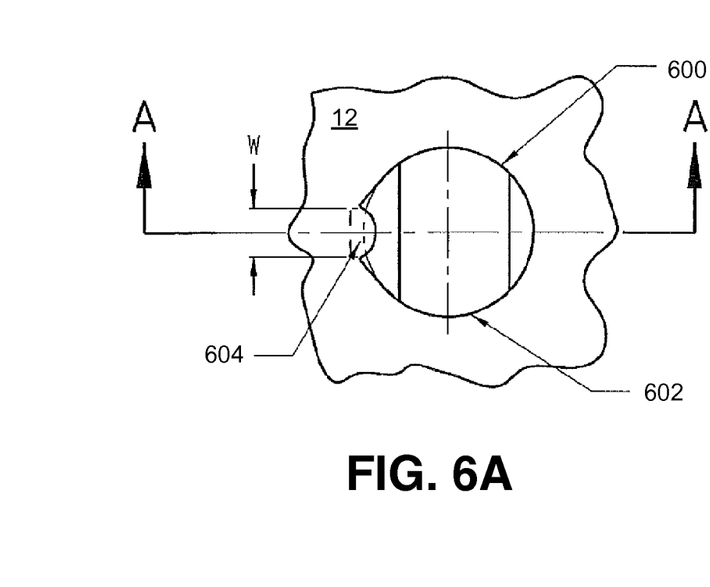
FIGS. 6A and 6B provide front and cross-sectional views, respectively, of a knockout for an electrical box according to another implementation described herein.
Figure 6B:
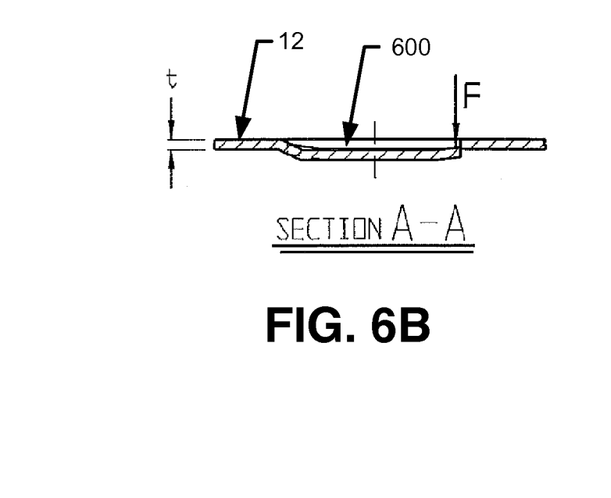
Figure 6C:
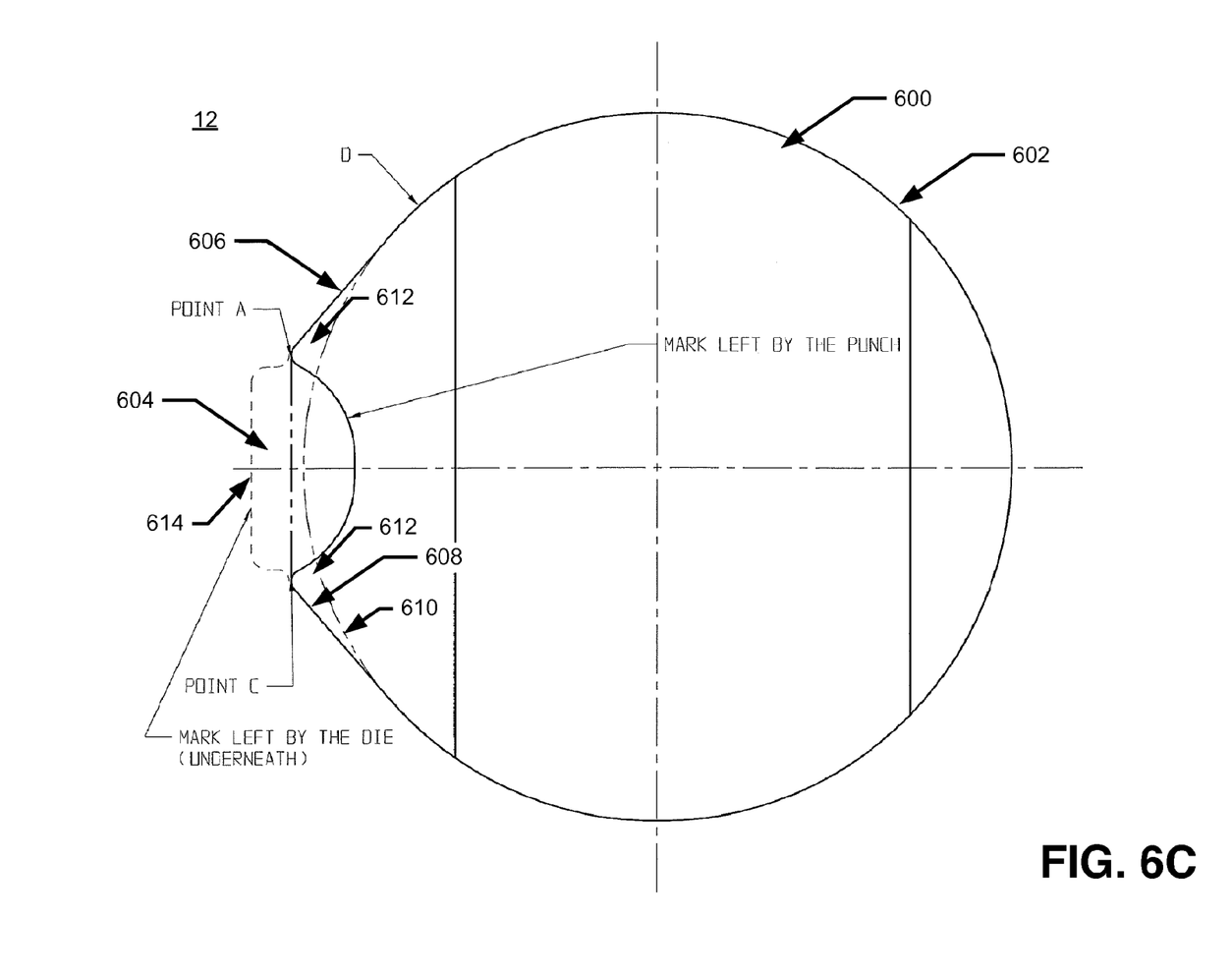
FIG. 6C provides an enlarged front view of the wall section of FIG. 6A.

FIGS. 6A-6C provide views of a knockout 600 for an electrical box according to another implementation described herein. FIG. 6A provides a front view of knockout 600 in a section of wall 12. FIG. 6B provides a cross-sectional view of a section A-A of FIG. 6A. FIG. 6C provides an enlarged front view of the front view of FIG. 6A.

Referring collectively to FIGS. 6A-6C, knockout 600 may be formed by a cutout 602 with a bridge section 604. The width, W, of bridge section 604 may span from point A to point C, and may be sized to provide the required knockout strength for a given material and wall thickness t. As an example, for a standard gage, "half-inch" diameter knockout (e.g., 0.875 in. actual diameter), the width of bridge section 604 may be about one-quarter (0.25) inch. As shown in FIGS. 6A and 6C, cutout 602 and corresponding knockout 600 may deviate from a circular shape. More particularly, cutout 602 extends along a tangent line 606 to point A and another tangent line 608 to point C. When knockout 600 is bent back (e.g., by application of force F) and forth, the material breaks along a chord of bridge section 604 from point A to point C. The resulting burr does not extend into the design diameter 610. Thus, the design diameter 610 is equal to the effective diameter (corresponding to circumference D of FIG. 6C), such that the entire design diameter 610 is available for connector and/or cable installation. Removal of knockout 600 along the chord of bridge section 604 from point A to point C may result in small gaps 612 between cutout 602 and design diameter 610.

A straight edge 614 may be formed on an underside of wall 12. Similar to straight edge 312 described above, straight edge 614 may reduce the amount of burr deformation (e.g., extending perpendicular to the plane of wall 12) upon removal of knockout 600.

Figure 7A:
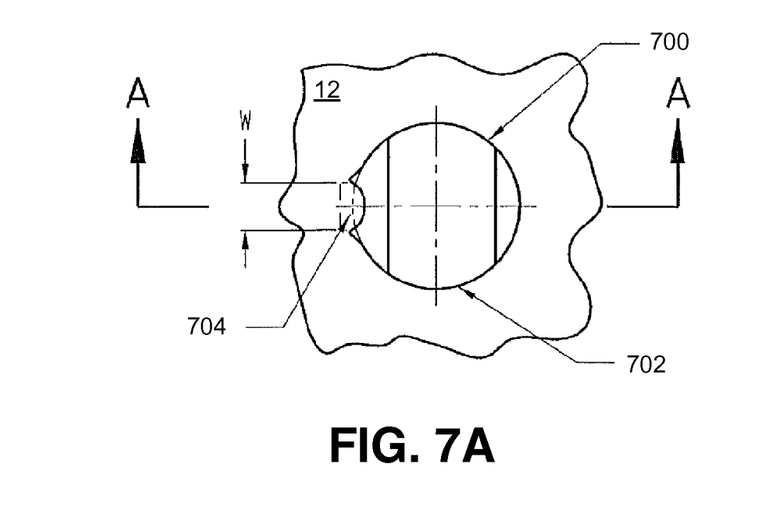
FIGS. 7A and 7B provide front and cross-sectional views, respectively, of a knockout for an electrical box according to still another implementation described herein.
Figure 7B:
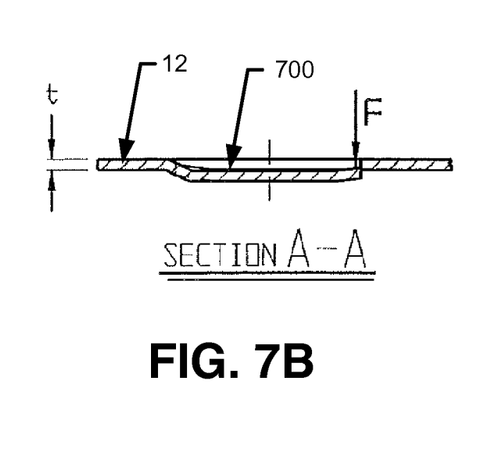
Figure 7C:
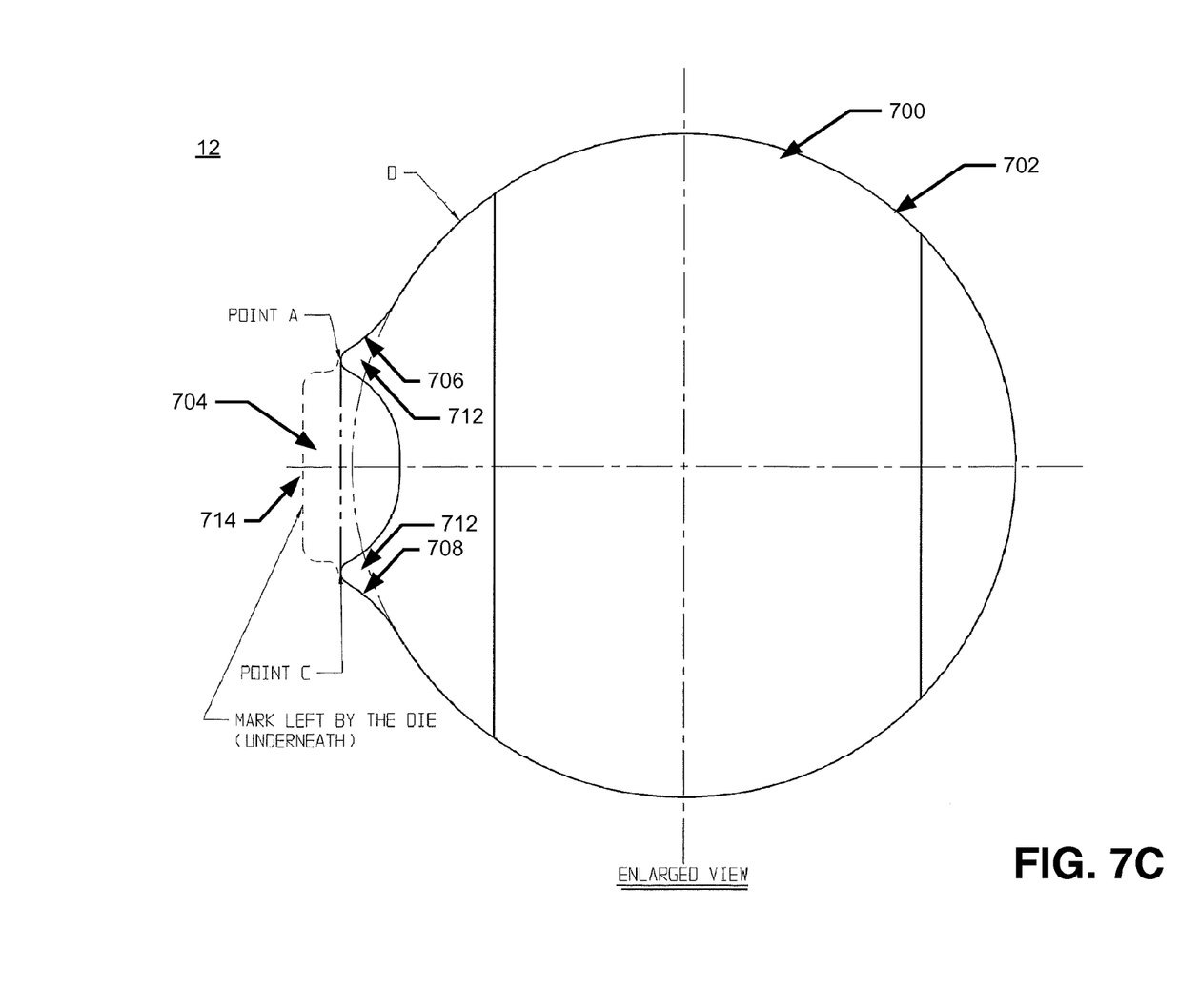
FIG. 7C provides an enlarged front view of the wall section of FIG. 7A.

FIGS. 7A-7C provide views of a knockout 700 for an electrical box according to yet another implementation described herein. FIG. 7A provides a front view of knockout 700 in a section of wall 12. FIG. 7B provides a cross-sectional view of a section A-A of FIG. 7A. FIG. 7C provides an enlarged front view of the front view of FIG. 7A.

Referring collectively to FIGS. 7A-7C, knockout 700 may be formed by a cutout 702 with a bridge section 704. The width, W, of bridge section 704 may span from point A to point C, and may be sized to provide the required knockout strength for a given material and wall thickness t. As an example, for a standard gage, "half-inch" diameter knockout (e.g., 0.875 in. actual diameter), the width of bridge section 704 may be about one-quarter (0.25) inch. As shown in FIGS. 7A and 7C, cutout 702 and corresponding knockout 700 may deviate from a circular shape. More particularly, cutout 702 extends along a tangent arc 706 to point A and another tangent arc 708 to point C. When knockout 700 is bent back (e.g., by application of force F) and forth, the material breaks along a chord of bridge section 704 from point A to point C. Similar to the configuration in FIGS. 6A-6C, the resulting burr along bridge 704 does not extend into the design diameter 710. Thus, the design diameter 710 is equal to the effective diameter (corresponding to circumference D of FIG. 7C), such that the entire design diameter 710 is available for connector and/or cable installation. Removal of knockout 700 along the chord of bridge section 704 from point A to point C may result in small gaps 712 between cutout 702 and design diameter 710. However, arc 706 and arc 708 may curve inward toward bridge section 704 to reduce the size of gaps 712 in comparison with the size of gaps 612 in FIG. 6C. The radius of arc 706/708 may be selected to minimize the size of gaps 712.

Similar to the configuration in FIGS. 6A-6C, a straight edge 714 may be formed on an underside of wall 12. Similar to straight edges 312 and 614 described above, straight edge 714 may reduce the amount of burr deformation (e.g., extending perpendicular to the plane of wall 12) upon removal of knockout 700.

In implementations described herein, a knockout structure for an electrical box is provided. The knockout structure is configured to reduce the impact of burrs after removal of the knockout and to allow better utilization of the full diameter of the cutout.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A knockout structure for a wall of an electrical box, the knockout structure comprising:
    a cutout forming a knockout on an interior of the cutout, the cutout penetrating through the thickness of the wall along a substantial perimeter of the knockout;
    a first bridge section interrupting continuity of the cutout and maintaining a connection between the wall and the knockout; and
    a second bridge section interrupting continuity of the cutout and maintaining a connection between the wall and the knockout, the second bridge section being different than the first bridge section and on a same half of the perimeter of the knockout.

2. The knockout structure of claim 1, wherein the knockout is substantially circular.

3. The knockout structure of claim 2, wherein the first bridge section and the second bridge section are separated along the perimeter of the knockout by less than ninety degrees.

4. The knockout structure of claim 2, wherein the first bridge section and the second bridge section are separated along the perimeter of the knockout by less than thirty degrees.

5. The knockout structure of claim 1, wherein the width of first bridge section is equal to width of second bridge section.

6. The knockout structure of claim 1, wherein the width of the first bridge section is configured to provide one-half of a required knockout strength for the knockout.

7. The knockout structure of claim 1, wherein the width of first bridge section and the width of second bridge section, when combined, are configured to provide a required knockout strength for the knockout, and
    wherein, when the knockout is removed, an effective diameter of the cutout is larger than an effective diameter that would result from use of a single bridge section providing the same required knockout strength.

8. The knockout structure of claim 1, wherein the wall includes an indention adjacent to the first bridge section with a straight edge outside the interior of the cutout.

9. The knockout structure of claim 1, wherein the width of the first bridge section is less than five percent of the perimeter of the knockout.

10. The knockout structure of claim 1, wherein the width of the first bridge section and the width of second bridge section, when combined, are less than ten percent of the perimeter of the knockout.

11. The knockout structure of claim 1, wherein the wall comprises galvanized steel.

12. The knockout structure of claim 1, wherein the cutout is formed using a punching process.

13. An electrical box, comprising:
a wall extending perpendicularly from a base; and
the wall including a knockout, wherein the knockout includes:
- a cutout extending around a majority of the knockout, the cutout penetrating through the thickness of the wall,
- a first bridge section interrupting continuity of the cutout, and
- a second bridge section interrupting continuity of the cutout, the second bridge section being different than the first bridge section and on a same half of a perimeter of the knockout.

14. The electrical box of claim 13, wherein the knockout is substantially circular and wherein, when the knockout is removed, an effective diameter of the cutout is at least ninety eight percent of a largest diameter of the cutout.

15. The electrical box of claim 13, wherein the first bridge section and the second bridge section are separated along a perimeter of the cutout by less than thirty degrees.

16. The electrical box of claim 13, wherein a combined width of the first bridge section and width of the second bridge section are configured to provide a required knockout strength for the knockout.

17. A knockout structure for a wall of an electrical box, the knockout structure comprising:
a cutout, the cutout penetrating through the thickness of the wall to form a substantially circular knockout; and
a bridge section interrupting continuity of the cutout and maintaining an attachment between the wall and the knockout,
wherein the knockout is configured to be separated from the wall by detaching the knockout at the bridge section, and
wherein, when separated from the wall, the knockout is configured to detach at a detachment line along the bridge section such that the detachment line is located outside a diameter of the substantially circular knockout.

18. The knockout structure of claim 17, wherein the cutout includes tangential lines extending between a substantially circular section of the cutout and a portion of the bridge section outside the diameter of the substantially circular knockout.

19. The knockout structure of claim 17, wherein the cutout includes tangential arcs extending between a substantially circular section of the cutout and a portion of the bridge section outside the diameter of the substantially circular knockout.

20. The knockout structure of claim 17, wherein the bridge section includes an indention in the wall, wherein the indentation includes a straight edge outside the interior of the cutout.

* * * * *